United States Patent
Kozai

[11] Patent Number: 5,945,657
[45] Date of Patent: Aug. 31, 1999

[54] CONSTANT DIVIDER

[75] Inventor: Kazuhiro Kozai, Kanagawa, Japan

[73] Assignee: NEC Corporation, Tokyo, Japan

[21] Appl. No.: 08/898,243

[22] Filed: Jul. 22, 1997

[30] Foreign Application Priority Data

Jul. 31, 1996 [JP] Japan ................................ 8-202361

[51] Int. Cl.⁶ .................................................. G06K 7/10
[52] U.S. Cl. ................................................. 235/462.01
[58] Field of Search ........................ 235/462.24, 462.25, 235/462.26; 714/756; 331/11, 16, 25; 708/102

[56] References Cited

U.S. PATENT DOCUMENTS

| | | | |
|---|---|---|---|
| 4,197,577 | 4/1980 | Shim et al. | 377/2 |
| 4,303,317 | 12/1981 | Tempelhof | 396/250 |
| 4,563,749 | 1/1986 | Yabuuchi | 708/102 |
| 5,216,387 | 6/1993 | Telewski | 331/11 |
| 5,315,540 | 5/1994 | Lawless . | |
| 5,473,620 | 12/1995 | Zook et al. | 714/756 |

FOREIGN PATENT DOCUMENTS

| | | |
|---|---|---|
| 52-99030 | 8/1977 | Japan . |
| 58-119045 | 7/1983 | Japan . |
| 59-134835 | 8/1984 | Japan . |
| 61-88334 | 5/1986 | Japan . |
| 2-190928 | 7/1990 | Japan . |
| 4-177529 | 6/1992 | Japan . |
| 6-110661 | 4/1994 | Japan . |
| 6-348461 | 12/1994 | Japan . |
| 8-202533 | 8/1996 | Japan . |

OTHER PUBLICATIONS

Lo, Man–Kit, *EDN Electrical Design News*, "Fast Algorithm Divides Big Numbers", vol.33, No. 24,p. 226, Nov. 14, 1988.

*IBM Technical Disclosure Bulletin*, "Fast Division Using Table Look–up", vol. 33, No. 6B, pp. 166–167, Jan. 1990.

Japanese Patent Application No. 6–348461, published Dec. 22, 1994 (was previously submitted with an IDS on Oct. 27, 1998).

*Primary Examiner*—Thien Minh Le
*Attorney, Agent, or Firm*—Sughrue, Mion, Zinn, Macpeak & Seas, PLLC

[57] ABSTRACT

A constant divider is described which includes: a plurality of stages of partial dividers each including a group of decoders, one decoder being provided for each bit of a dividend and each decoder outputting a quotient and remainder resulting from division of a value associated with a bit when that bit is "1", and quotient adders that add the quotient output of each decoder of that decoder group; in partial dividers other than that of the last stage, a remainder adder that adds output values of remainders of each decoder of the decoder group of that stage; in the last stage of the partial dividers, a corrective decoder that outputs a corrective output of the quotient and a corrective output of the remainder produced by dividing the output of the remainders of each decoder of the last-stage decoder group by the divisor; and finally, a quotient output adder that adds the quotient adder output of each stage and the corrective output of the quotient of the last stage, wherein the first-stage partial divider receives the dividend, partial dividers of succeeding stages receive as the dividend the output of the remainder adder of the partial divider of the preceding stage.

14 Claims, 7 Drawing Sheets

| | DIVIDEND | DIVISOR | QUOTIENT DECODING | REMAINDER DECODING |
|---|---|---|---|---|
| LEAST SIGNIFICANT BIT | $(0001)_2$ | $(10)_2$ | $(00)_2$ | $(01)_2$ |
| SECOND LOWEST DIGIT | $(0010)_2$ | $(10)_2$ | $(01)_2$ | $(00)_2$ |
| THIRD LOWEST DIGIT | $(0100)_2$ | $(10)_2$ | $(10)_2$ | $(00)_2$ |
| FOURTH LOWEST DIGIT | $(1000)_2$ | $(10)_2$ | $(100)_2$ | $(00)_2$ |

FIG. 9

CONSTANT DIVIDER

BACKGROUND OF THE INVENTION

1. Field of the Invention

The present invention relates to a divider, and particularly to the configuration of a divider in which the divisor is a fixed constant.

2. Description of the Related Art

The circuit configuration of dividers known in the prior art that are constructed from, for example, integrated circuits take as a basis a subtraction process in which the quotient is the number of times the divisor can be subtracted from the dividend and the balance is the remainder. Devices taking the subtraction process as a basis adopt a variety of methods of accelerating the processing speed. The number of subtractions is reduced by repeatedly obtaining the remainder (partial remainder) and the quotient (partial quotient) by subtracting the divisor from the higher-order digit of the dividend and then obtaining the quotient and remainder of the next column by again subtracting the divisor from the sum of this remainder and the succeeding digit.

The number of processes can be further reduced in cases in which the divisor is a pre-determined constant. For example, Japanese Patent Laid-open No. 88334/86 describes a case in which the quotient and remainder are stored in a memory for a figures assumed in advance to be dividends, following which the memory is addressed by the dividend to extract the quotient and remainder. However, a massive amount of memory is required if the figures presupposed as the dividend are set to infinity, and consequently, the quotient and remainder for all numbers of a set digit number are set in memory, the memory is addressed from the higher-order digits of the dividend and partial quotients and partial remainders obtained, and the same processes repeated for numbers resulting from addition of these partial remainders to obtain the final quotient and remainder.

A large number of division processes are thus required if a division process is repeated. For example, a processing time of at least one control clock is required for each division process, and the processing time increases in accordance with the number of digits or the number of bits of the dividend. This problem will be further explained with reference to the accompanying figures.

Figure 1:
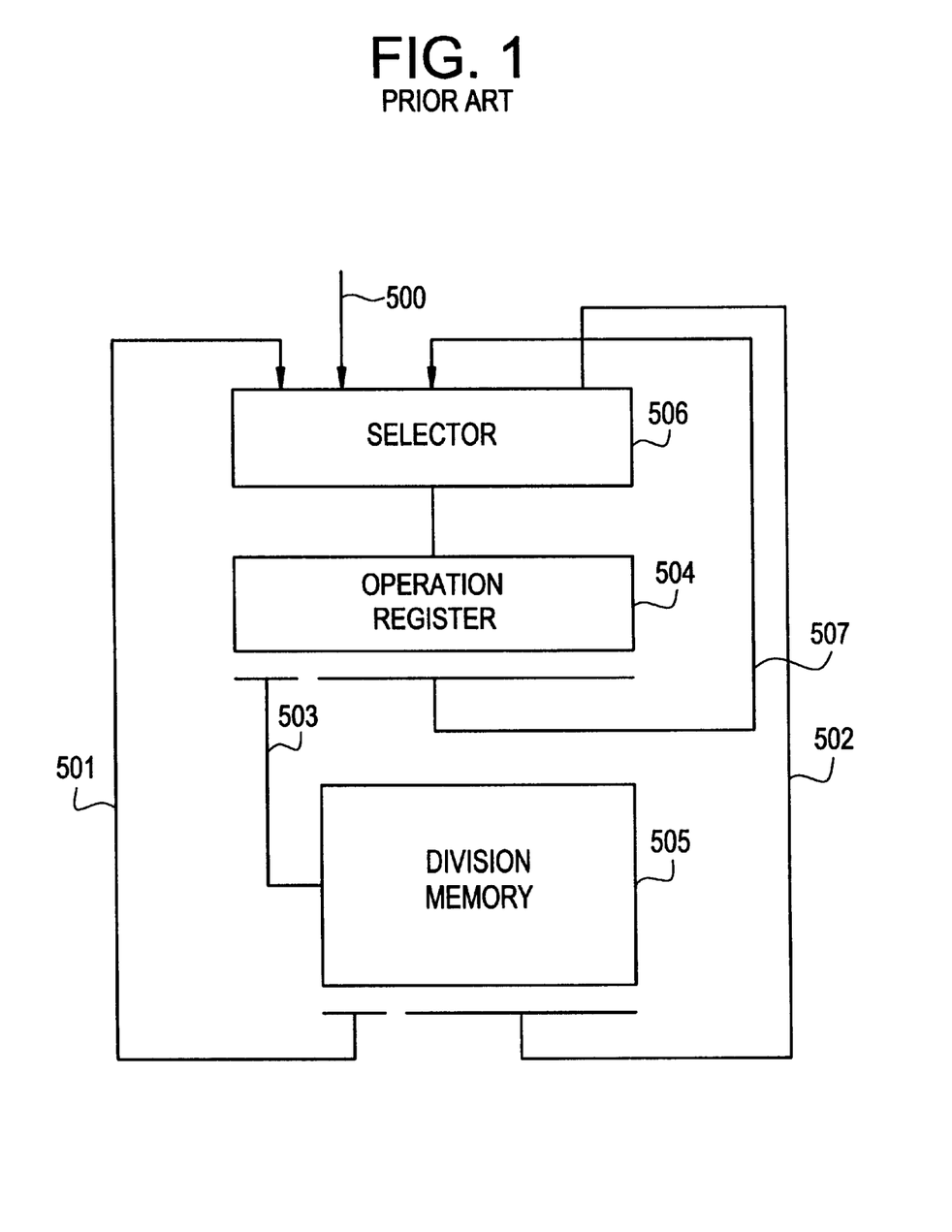
FIG. 1 is a block diagram showing a constant divider using a memory according to the prior art.
Figure 2A:
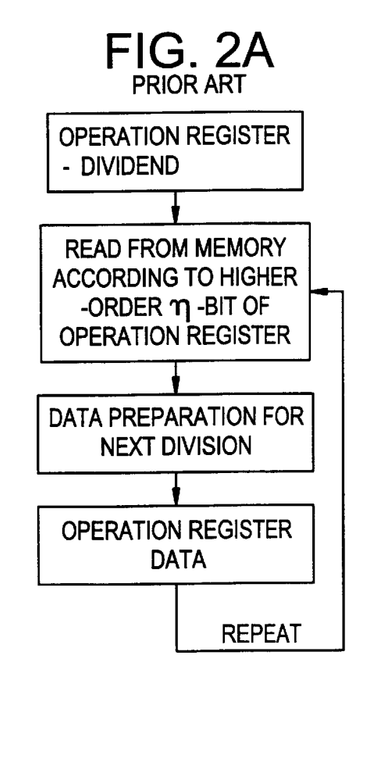
FIG. 2A is a flowchart of the process of a constant divider using a memory according to the prior art.
Figure 2B:
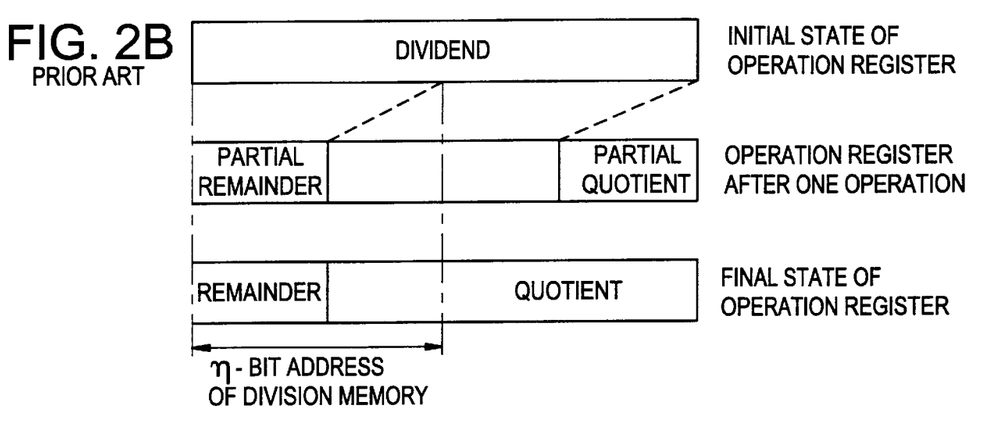
FIG. 2B is an explanatory view of the operation of a constant divider using a memory according to the prior art.
Figure 2C:
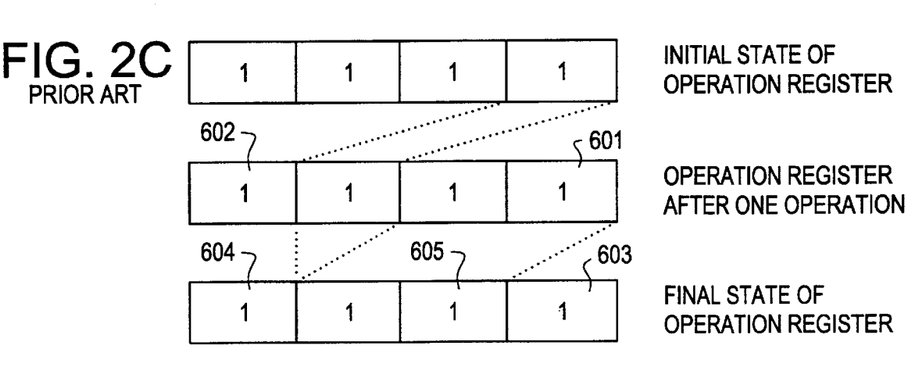
FIG. 2C is an explanatory view of the operation of a constant divider using a memory according to the prior art.

FIG. 1 is a block diagram showing the divider described in Japanese Patent Laid-open No. 88334/86, FIG. 2A is a flowchart of the processes of this divider, and FIGS. 2B and 2C are flowcharts showing the state of the operation register. As shown in FIG. 1, the dividend is sent by way of line 500 and is then set to operation register 504 under the control of selector 506. The higher-order bit information of the dividend stored in operation register 504 passes by way of line 503 and is applied to division memory 505 as an address, and a partial remainder and partial quotient are each outputted to line 501 and line 502, respectively. The partial remainder of line 501, together with the lower-order bit information of the dividend that has not undergone the operation process that is supplied from line 507, are again set to operation register 504 by way of selector 506. The higher-order bit information that is thus set again to operation register 504 is subjected to the division process using division memory 505, and a similar division process is repeated until the value within operation register 504 is less than the divisor.

An explanation will next be presented using FIG. 1 and FIGS. 2A–2C which illustrate a concrete operation in which the 3 higher-order bits from operation register 504 are taken as the object of the division process, the binary number value of dividend being "1111b" and the binary number value of the divisor being "10b" (b indicating that these are binary numbers). In the first subtraction process loop, the 3 higher-order bits of dividend "1111b" set to operation register 504 (i.e., "111b") are applied to division memory 505 as an address by way of line 503. The values for the partial quotient "11b" and partial remainder "1b" are set in advance at address "111b" and are outputted from lines 501 and 502. Partial quotient, partial remainder, and the remaining bits of dividend are reset to operation register 504 by means of selector 506 and value obtained. The partial quotient "11b" outputted by way of line 502 is set to the lower-order bit 601 of operation register 504. The partial remainder "1b" outputted by way of line 501 is set to the higher-order bit 602 of operation register 504. The remaining bits of the dividend are set between the partial quotient and partial remainder following the partial quotient. The value of operation register 504 is thus "1111b" as a result of the first division process loop. Next, the higher-order bit "11b" made up by the partial remainder "1b" and the remaining bit "1b" of the dividend is still greater than the divisor "10b", and this value is therefore added to division memory 505 as an address by way of line 503, and the second division process loop is carried out. The partial quotient "1b" and partial remainder "1b" are set at address "11b" of division memory 505. The partial quotient "1b" is set to the lower-order bit 603 of operation register 504, the partial remainder "1b" is set to the higher-order bit 604, and the first partial quotient "11b" is shifted to the higher order of lower-order bit 603. As a result, the higher-order bit "1b" apart from partial quotients 605 and 603 becomes smaller than the divisor "10b", thereby completing the division process, and the value "111b", which is the combination of partial quotients 605 and 603, is taken as the final quotient, and the last remainder "1b" is taken as the final remainder.

The division process is thus repeated a plurality of times despite the use of memory and division cannot be realized in a single process, which is the minimum number of processes, and the processing time is protracted. Reducing the number of bits taken from operation register 504 and used to address the division memory decreases the amount of memory required, but also increases the number of loops of division processing and lengthens the processing time. On the other hand, increasing the number of bits used to address the division memory shortens the processing time but increases the amount of memory required by an exponent of the number of bits.

Japanese Patent Laid-open No. 190928/90 discloses an example in which a comparator circuit and a decoder are used in place of the memory that is used in the above-described example of the prior art. This device replaces division memory 505 of FIG. 1 with a divider that employs a comparator circuit and decoder, provides a plurality of comparator circuits that compare an integer power of the divisor with the bits to be divided of the dividend, calculates partial quotients and partial remainders by decoding the output of this plurality of comparator circuits at the decoder, and in the same way as the prior-art example of FIG. 1, takes the combination of partial quotients as the final quotient and the last remainder as the final remainder.

As with the prior-art example employing a memory (Japanese Patent Laid-open No. 88334/86), this example of the prior art entails a plurality of division processes and a protracted processing time. Moreover, as in the other prior-art example that uses a memory, the number of comparator circuits in this example increases with the number of bits of the object division for which partial quotients are produced, but this example raises an additional problem in that comparator circuits require far more space than a case using memory.

SUMMARY OF THE INVENTION

The object of the present invention is to provide a divider in which the divisor is fixed and that requires a shorter processing time.

Another object of the present invention is to provide a divider in which the divisor is fixed and that can decrease processing time by not including process loops in which the same process is repeated within the process flow.

Still another object of the present invention is to provide a divider in which the divisor is fixed, that has a configuration suited to a semiconductor integrated circuit, and in which, despite the improvement in processing speed, the surface area on the integrated circuit that is monopolized by the circuit structure necessary for the division process is small.

A divider according to the present invention comprises:
  in a divider that divides a dividend by divisor that is a predetermined number;
  a decoder group composed of decoders that receive a dividend, that are provided for each bit of the binary number of this dividend, and that, when the bit is "1b", output a quotient and a remainder produced by dividing a value held by the bit by the divisor; and, when that bit is "0b", output "0" as the quotient and the remainder;
  a quotient adder that adds the value of the quotients outputted by each decoder of the decoder group; and
  a remainder adder that adds the value of the remainder outputted by each decoder of the decoder group.

In addition, a divider according to the present invention comprises:
  a plurality of stages of partial dividers that divide a dividend by a divisor which is a predetermined number and that each include: a decoder group composed of decoders that receive a dividend, that are provided for each bit of the binary number of this dividend, and that, when the bit is "1b", output a quotient and a remainder produced by dividing a value held by the bit by the divisor; and when that bit is "0b", output "0b" as the quotient and the remainder; and a quotient adder that adds the value of quotients outputted by each decoder of this decoder group;
  remainder adders in the partial dividers other than that of the last stage that add values of the remainders outputted by each decoder of the decoder group of that stage;
  a corrective decoder in the partial divider of the last stage that outputs a corrected output of a quotient and a corrected output of a remainder produced by dividing by the divisor the output value of the remainder of each decoder of the decoder group of the last stage;
  a quotient output adder which adds the outputs of the quotient adders of each stage and the corrected output of the quotient of the last stage, wherein the partial divider of the first stage receives the dividend and the partial dividers of each succeeding stage receive as dividend the output from the remainder adder of the partial divider of the preceding stage; whereby the output of this quotient output adder is taken as the final quotient and the corrected remainder output from the corrective decoder of the partial divider of the last stage is taken as the final remainder.

Moreover, a method of dividing by a constant according to the present invention comprises, in a method in which a dividend is divided by a predetermined divisor:
  a decoding step in which a dividend is received, and for each bit of the binary number of this dividend, a quotient and remainder produced by dividing the value held by the bit by a divisor are outputted when the bit is "1b", and "0" is outputted as the quotient and remainder when the bit is "0b";
  a quotient adding step in which the quotients outputted for every bit in the decoding step are added;
  and a remainder adding step in which the remainders outputted for every bit in the decoding step are added.

In addition, the method of dividing by a constant according to the present invention is a method which effects division by a divisor which is a predetermined number, which executes a plurality of division steps including: a decoding step in which a dividend is received, and for each bit of the binary number of this dividend, a quotient and remainder produced by dividing a value held by a bit by a divisor are outputted when the bit is "1b", and "0" is outputted as quotient and remainder when the bit is "0b"; and a quotient adding step in which quotients outputted for every bit in the decoding step are added;
  the method comprising:
    in the plurality of division steps other than the last division step, remainder adding steps in which the remainders outputted for each bit are added;
    a corrective decoding step in which a corrective output of the quotient and corrected output of a remainder produced by dividing by a divisor a remainder outputted for every bit are outputted in the last division step of a plurality of division steps; and
    a quotient output adding step in which, in the first division step, the dividend of the sought division is received as the dividend and in succeeding division steps the output of the remainder adding step of the preceding division step is received as the dividend, and the output of each quotient adding step and the corrective output of the quotient of the last division step are added;
    the output of this quotient output adding step being taken as the final quotient, and the corrected remainder output of the corrective decoder step of the last division step being taken as the final remainder.

According to the present invention, loops in which processes are repeated are eliminated because the decoders are used in a series, and the division process therefore does not require control by a clock. As a result, a division process can be completed in one clock, thereby allowing an increase in processing speed. Consequently, complex timing need not be considered when designing a circuit, and circuit design is accordingly simplified. Moreover, decoders are formed according to the bit units of the dividend, and the circuit configuration of each decoder is therefore automatically determined when the divisor is established. In the examples of the prior art in which division must be repeated for the plurality of bits of the dividend, difficulty is encountered in attempting to accelerate the processing speed or restrain increases in size due to space requirements of memory or comparators. In contrast, the decoders used in this invention are much smaller than comparators, and moreover, do not require space-consuming peripheral devices such as address control or sense amplifiers as would a memory in a prior art case. The present invention therefore enables high-speed division without monopolizing a large area.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

The present invention will next be explained with reference to the accompanying figures.

Figure 3:
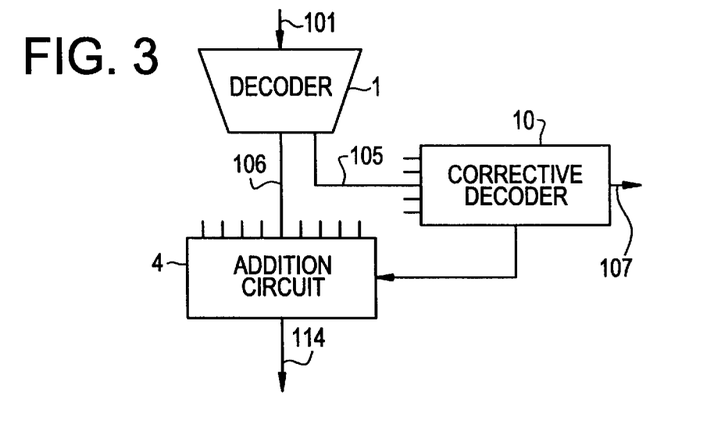
FIG. 3 is a block diagram showing the configuration of a first embodiment of the present invention.

FIG. 3 is a block diagram showing the first embodiment of the present invention. This embodiment uses a decoder made up of just one stage, and the dividend is brought to decoder 1 by way of line 101. Decoder 1 is a general name for the entire component, and in actuality, an individual decoder is provided for each bit of the 64 bits which constitute the maximum number of bits in a dividend, and each bit of the dividend, which is received as a binary number, is inputted to a corresponding individual decoder.

The individual decoders are designed so as to decode the state when a number corresponding to arranged bits is divided by a pre-set divisor. In other words, the individual decoders are designed so as to output "0" as the quotient and remainder when the bit information of the dividend held by that bit is "0b", and to output the quotient and remainder produced by dividing the decimal number value held by the bit by the preset divisor when the dividend bit information held by the bit is "1b". For example, when the dividend is the binary number "1111b" and the divisor is "10b", the decoder of the least significant bit outputs "0" as the quotient and outputs the decimal number value of the dividend of that bit as the remainder (in this case, "1h" (where h indicates that the number is a decimal number)). Since the bit of the dividend corresponding to the second bit from the least significant bit is "1b", the decoder of this bit is designed so as to output "1h" as the quotient and to output "0" as the remainder. Since the bit of the dividend corresponding to the third bit from the least significant bit is "1b", the decoder of this bit is designed to output "2h" as the quotient and "0" as the remainder. In the same way, the decoder of the most significant bit is designed to output "4h" as the quotient and "0" as the remainder.

The quotient output of each individual decoder is sent from line 106 (provided in a number equal to that of the individual decoders) to addition circuit (adder) 4 and added. The remainder output of each individual decoder is sent by line 105 (provided in a number equal to that of the individual decoders) to corrective decoder 10 where it is determined by decoding processing whether or not the remainder is larger than the divisor. If the remainder is greater than the divisor, a corrective output of the quotient is outputted to the addition circuit. The final remainder is outputted by corrective decoder 10. The example described in the explanation of the construction of individual decoders has no corrective output for the quotient, and the output of quotient adder 4 is therefore "1h"+"2h"+"4h"="7h", and the output from the corrective decoder 10 is "1h". These outputs are the final quotient and remainder.

Regarding the role of corrective decoder 10, if the value of the divisor is of 4 bits (for example, "1100b"), no quotient will be outputted for the lower 4 bits of the dividend because each bit is divided by the divisor, and as a result, a remainder greater than the divisor is generated. The value of the final quotient is corrected by decoding this remainder, which is greater than the divisor.

Figure 4:
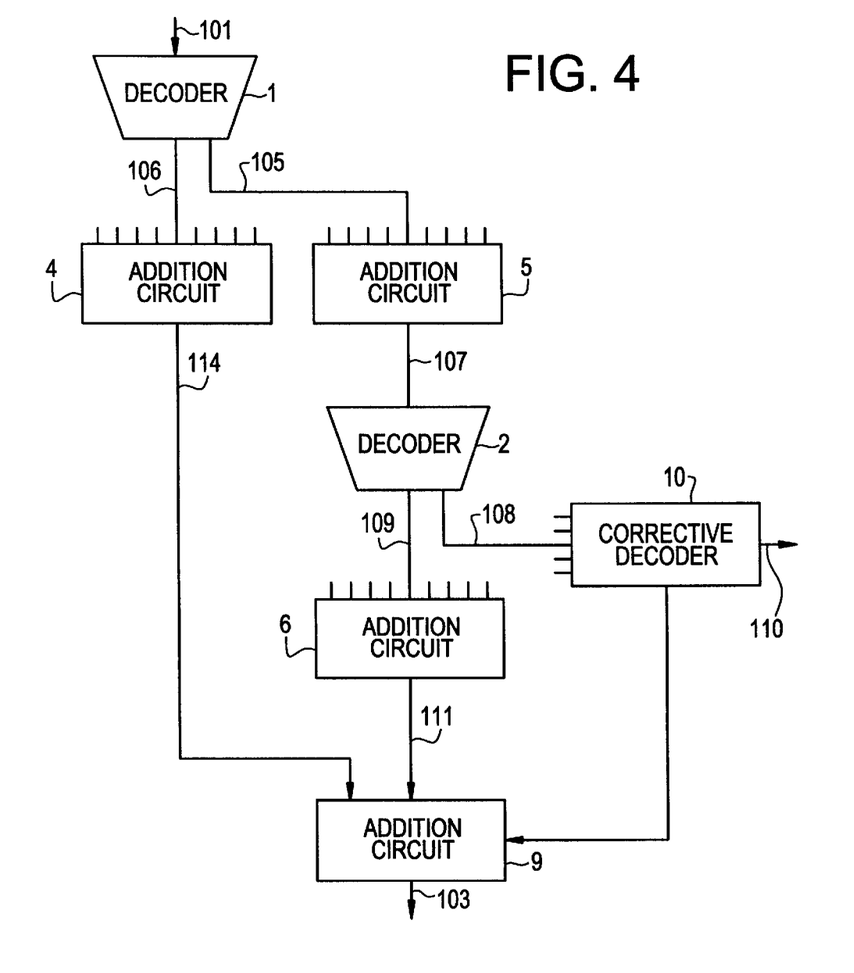
FIG. 4 is a block diagram showing the configuration of a second embodiment of the present invention.
Figure 5:
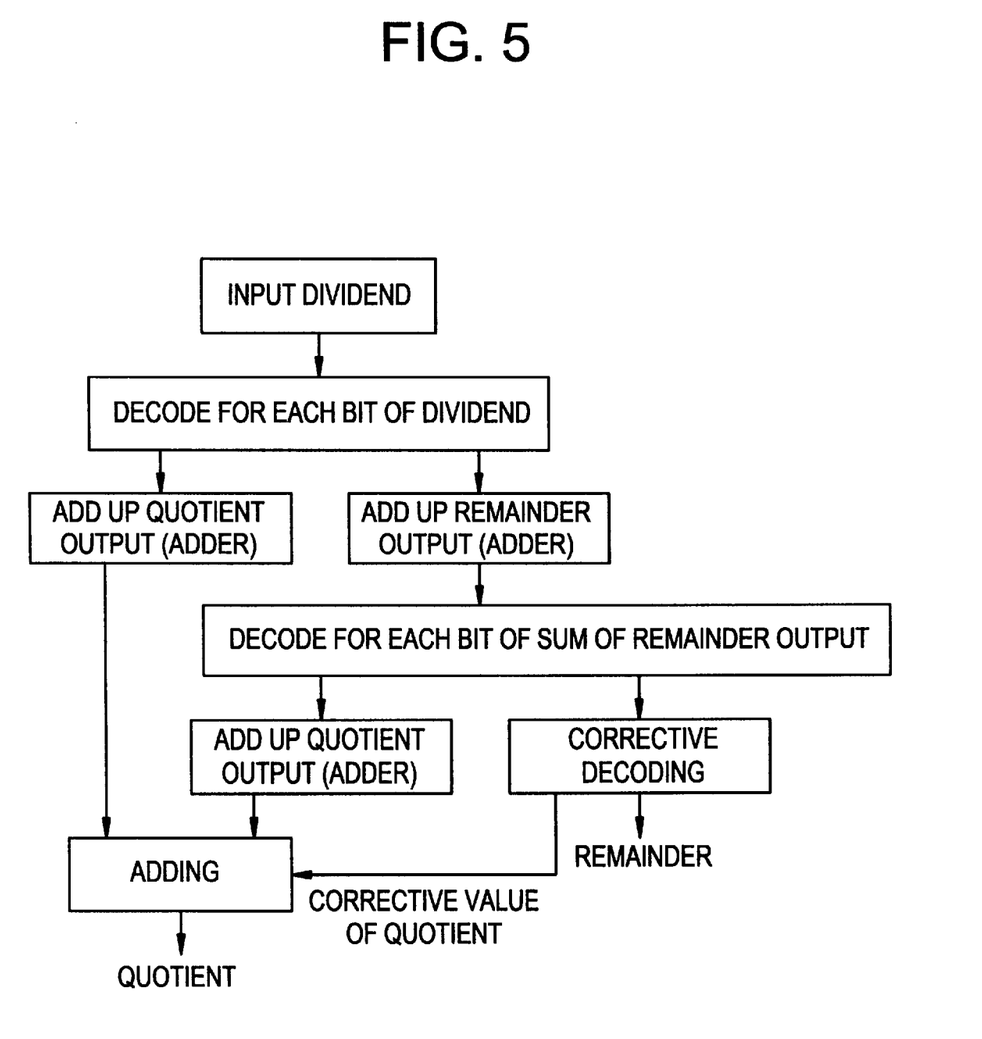
FIG. 5 is a flowchart showing the process by the second embodiment of the present invention.

The second embodiment is formed by a two-stage decoder having a circuit configuration shown in the circuit block diagram in FIG. 4 and a division process illustrated in the flowchart of FIG. 5.

The dividend is inputted to first-stage decoder 1 from line 101. Decoders 1 are provided for each bit of the dividend, and at each bit, if the bit of the dividend is "1b", the quotient produced by dividing the numerical value of that bit by the divisor is outputted to line 106 and the remainder is outputted to line 105. The quotient output of each decoder 1 is added at addition circuit 4. The remainders are similarly added at addition circuit 5. The addition value of each remainder (the output of addition circuit 5) is applied to second-stage decoder 2. Second-stage decoders 2 are also provided for each bit of the binary number of the addition circuits, and if a bit is "1b" the quotient produced by dividing the numerical value of that bit by the divisor is applied to addition circuit 6 by way of line 109. The remainders are applied to corrective decoder 10 by way of line 108. No output is produced if the bit of a second-stage decoder 2 is "0b". The remainders from a plurality of second-stage decoders 2 are added to corrective decoder 10, a corrective value of the quotient is outputted to addition circuit 9 if the sum of the remainders is greater than the divisor, and the balance is outputted to line 110 as the final remainder. If the sum of remainders from the plurality of second-stage decoders 2 is less than the divisor, no corrective value of the quotient is generated and the remainder is outputted from line 110 without alteration. On the other hand, the output of addition circuit 4 and the output of addition circuit 6 are applied to addition circuit 9 together with the corrective value of the quotient of corrective decoder 10, and outputted as a final value to line 103.

Figure 6:
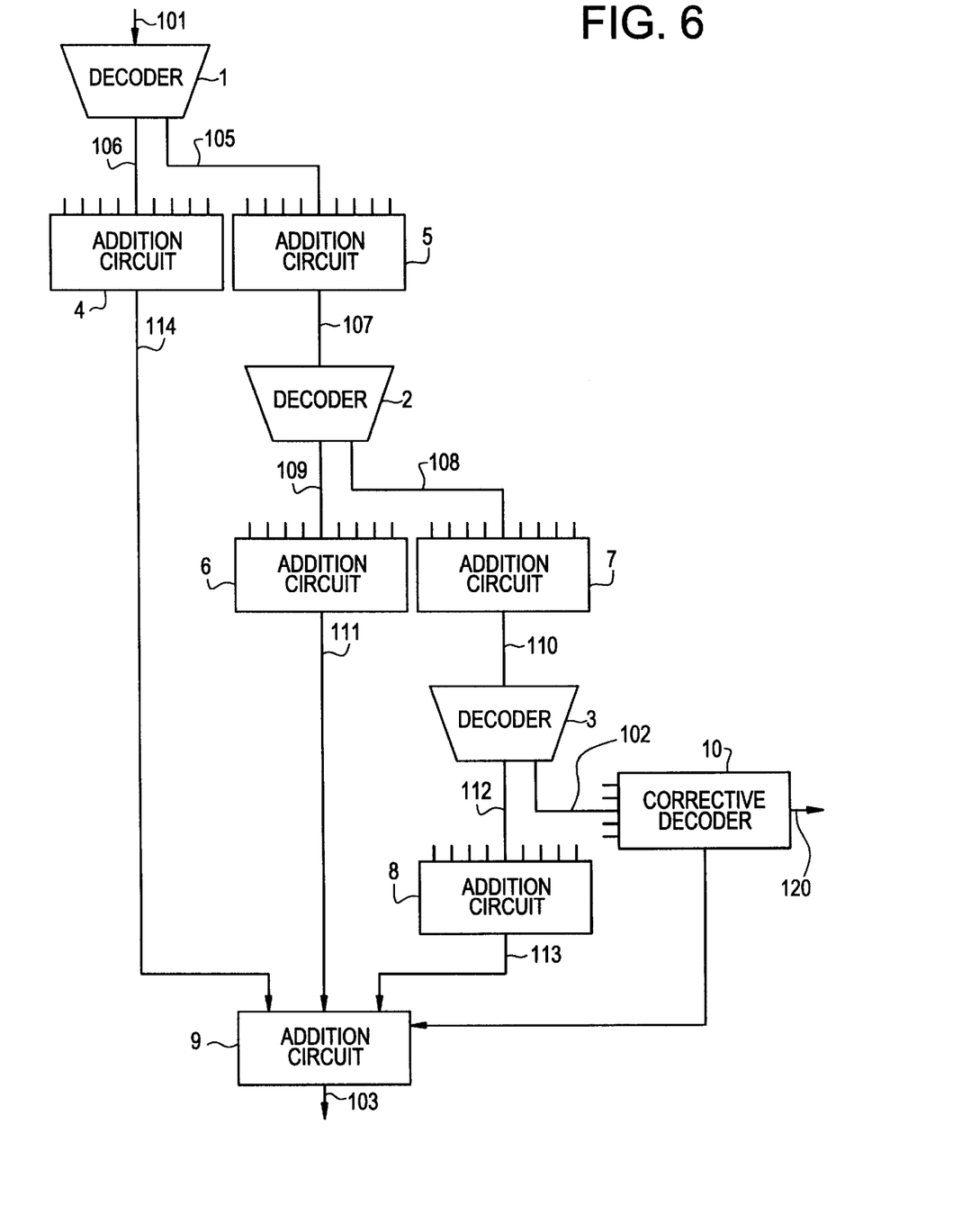
FIG. 6 is a block diagram showing the construction of a third embodiment of the present invention.
Figure 7:
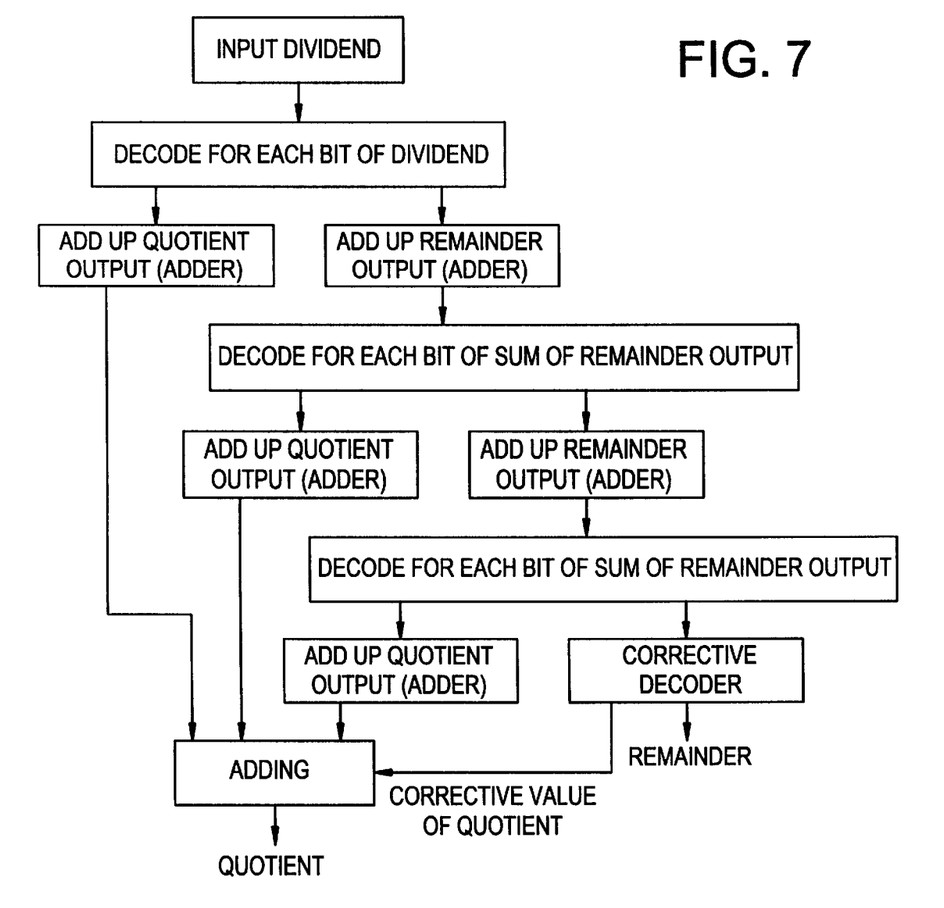
FIG. 7 is a flowchart showing the process of the third embodiment of the present invention.

The third embodiment of the present invention is formed from a decoder of three-stage construction having a circuit configuration shown by the block diagram of FIG. 6 and a division process shown by the flow chart of FIG. 7.

Each binary number bit of the dividend is applied to first-stage decoder 1 by way of line 101. Decoding for division by the divisor is performed for each bit by first-stage decoder 1, the quotient for each bit is applied to addition circuit 4 by way of line 106, and the remainders are applied to adder 5 by way of line 105. The output of adder 5 is applied to second-stage decoder 2 for every bit of the binary number. Decoding for division by the divisor is performed for each bit by second-stage decoder 2. Quotients produced by second-stage division are applied to addition circuit 6 by way of line 109, and the remainders are similarly applied to addition circuit 7 by way of line 108. The output of addition circuit 7 is applied to third-stage decoder 3 for each binary number bit. Third-stage decoder 3 also performs decoding for division by the divisor for each bit, and the quotients are applied to addition circuit 8 by way of line 112. The remainders for each bit of third-stage decoder 3 are applied to corrective decoder 10 by way of line 102. At corrective decoder 10, corrective output of the quotient is applied to addition circuit 9 if the sum of the remainder output of each third-stage decoder 3 is greater than the divisor and the remainder is outputted as the final remainder by way of line 120. If the sum of the remainder of third-stage decoder 3 is less than the divisor, the remainder is outputted without alteration from line 120 as the final remainder. The quotient output of each decoding stage is outputted from addition circuits 4, 6, and 8, and the addition result of applying these to addition circuit 9 along with the corrective value of the quotient from corrective decoder 10 is outputted as the final quotient from line 103.

Figure 8:
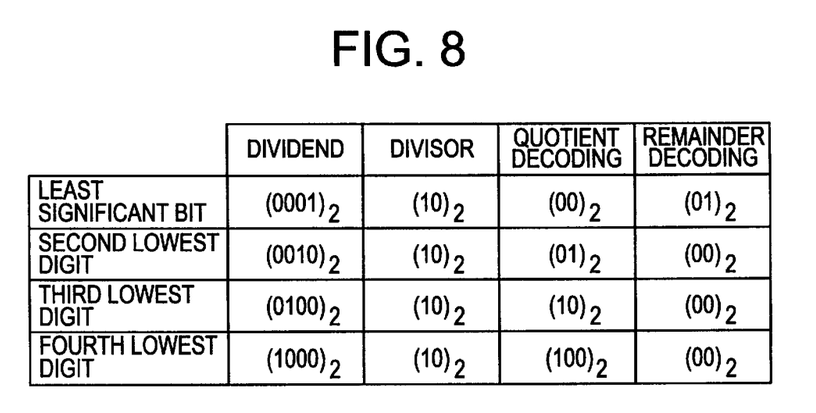
FIG. 8 is a table for explaining the operation of the decoder of each embodiment of the present invention.

FIG. 8 is a table showing the values of quotient output and remainder output of the decoders for each bit of the dividend when the dividend is "1111b" and the divisor is "10b". In the example shown in this decode table, division can be realized by the one-stage configuration shown in FIG. 3. The quotient "1111b" is obtained by adding at addition circuit 4 the quotients "00b", "01b", "10b" and "100b" outputted from each of four first-stage decoders.

If the dividend is "010b", neither quotient output nor remainder output are outputted for the most significant bit or the second lowest bit. The quotient "10b" is the sum of the quotient "00b" of the least significant bit and the quotient "10b" of the third lower digit. Similarly, the remainder "01b" is the sum of the quotient "00b" of the least significant bit and the quotient "01b" of the third lowest digit.

Next, regarding an example of the calculation of the two-stage configuration of FIG. 4, if the dividend is the 28-bit "FFFFFFFh" and the divisor is the 3-bit "7h", the quotient output (line 114) of first-stage addition circuit 4 is "2492489h" and the remainder output (line 107) of addition circuit 5 is "40h". The second-stage division is therefore the division of remainder output "40h" by divisor "7h", the quotient output (line 111) of addition circuit 6 is "9h", no corrective value of the quotient is outputted from corrective decoder 10, and the remainder "1h" is obtained. The final quotient, for which this remainder "1h" is the final remainder, i.e., "2492489h"+"9h"="2492492h", is obtained as output (line 103) from addition circuit 9.

Next, regarding an example of calculation by the three-stage configuration shown in FIG. 6, if the dividend is the 17-bit "1FFFFh" and the divisor is the 3-bit "7h", the quotient output (line 114) of the first-stage addition circuit 4 is "491h", the remainder output (line 107) of addition circuit 5 is "26h", the quotient output (line 111) of second-stage addition circuit 6 is "4h", and the remainder output (line 110) of addition circuit 7 is "3h". The quotient output (line 113) of third-stage addition circuit 8 is "1h", no corrective value of the quotient is outputted from corrective decoder 10, and the remainder output "3h". This remainder output "3h" is the final remainder. The final quotient is the sum of the quotient output (line 114) of first stage addition circuit 4, the quotient output (line 111) of second-stage addition circuit 6, the quotient output (line 113) of third-stage addition circuit 8, and the corrective value output of the quotient from corrective decoder 10, which in this case is "491h"+"4h"+"4h"+"0h"="4924h"

The number of bits of numbers used in computers normally does not exceed 64, and an investigation of the number of stages of decoders necessary for division using a variety of numbers shows that three stages are clearly sufficient if a corrective decoder is provided in the last stage. For example, if the dividend is of 64 bits, which is the maximum, and a 2-bit number "11b" is chosen as the divisor to maximize the sum of the remainders, the maximum value of the sum of remainders in the first stage is the decimal numeral "96", which is a 7-bit number. Similarly, the maximum value of the sum of remainders in the second stage is the decimal numeral "10", which is a 4-bit number. The maximum value of the sum of remainders in the third stage is the decimal numeral "96", which is a 7-bit number. Similarly, the maximum value of the sum of remainders in the second stage is the decimal numeral "10", which is a 4-bit number. The maximum value of the sum of remainders in the third stage is the decimal numeral "6", which is a 4-bit number. In this way, the sum of remainders becomes sufficiently small in three stages, and can be managed through correction by decoders.

On this point, as the dividend becomes larger in a constant division circuit that uses a memory according to the prior art, the amount of memory required increases radically and the amount of space monopolized by memory and peripheral memory devices also increases. In contrast, no more than three stages of decoders are used in this invention and the amount of monopolized space can therefore be reduced.

Figure 9:
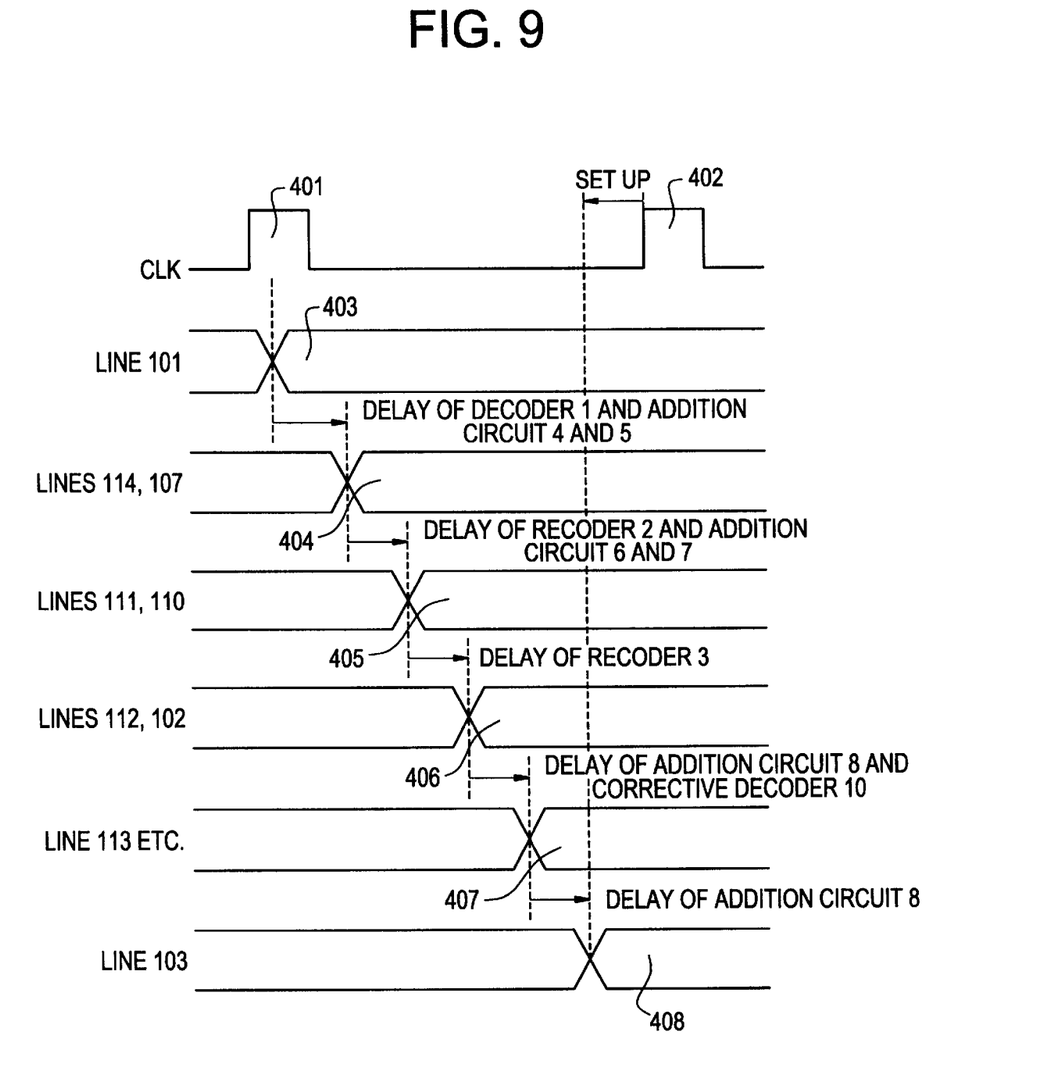
FIG. 9 is a timing chart for illustrating the operation of each embodiment of the present invention.

The timing of the operation of the divider of the present invention will next be described with reference to FIG. 9. The timing is such that an operation is completed in the period of one clock regardless of whether the divider is of one-stage, two-stage, or three-stage configuration. Here, an example of three-stage configuration will be described.

At the rise of clock 401, the dividend is inputted to the first-stage decoders from line 101 and the input becomes effective at timing 403. After the delay time resulting from the operation of first-stage decoder 1 and addition circuits 4 and 5, output is obtained at lines 114 and 107 at timing 404, and the sum of the remainders is applied to second-stage decoder 2. Next, after the operation delay time of second-stage decoder 2 and addition circuits 6 and 7, output is obtained from lines 111 and 110 at timing 405 and applied to third-stage decoder 3. Output is next obtained from lines 112 and 102 after the operation delay time of third decoder 3 at timing 406 and applied to addition circuit 8 and corrective decoder 10. Next, after the operation delay time of addition circuit 8 and corrective decoder 10, an output signal is obtained at timing 407 at the output of addition circuit 8 (line 113) and the output of corrective decoder 10. The output (line 113) of addition circuit 8 and the corrective output of the quotient are inputted to addition circuit 9. The remainder output of corrective decoder 10 is outputted at this time to line 120 as the final remainder. After the operation delay time at addition circuit 9, the quotient output is obtained at line 103 at timing 408. The next division then becomes possible with the rise of the next clock 402. In this way, one division can be completed within the period of one clock.

Completion of division in the period of one clock in this way not only enables high-speed division operations, but greatly simplifies the design of clock operation of the circuits of the device overall. As a result, the present invention is effective in address translation from a one-dimensional address to a two-dimensional address when accessing memory in, for example, graphics processing.

What is claimed is:

1. A constant divider comprising:
    first decoding means provided for each bit of inputted dividend data that outputs quotient data and remainder data produced by dividing a value held by a bit by a prescribed divisor when said bit is "1";
    first quotient adding means that adds quotient data outputted for each bit from said first decoding means;
    first remainder adding means that adds remainder data outputted for each bit from said first decoding means;
    second decoding means provided for each bit of added remainder data outputted from said first remainder adding means that outputs quotient data and remainder data produced by dividing a value held by a bit by a prescribed divisor when said bit is "1";
    second quotient adding means that adds quotient data outputted for each bit from said second decoding means;
    corrective decoding means that outputs a corrective quotient value and a corrected remainder value when a remainder value from remainder data outputted for each bit from said second decoding means is equal to or greater than said prescribed divisor; and
    third quotient adding means that adds each output of said first quotient adding means, said second quotient adding means and said corrective decoding means and outputs final quotient data.

2. A constant divider comprising:
    first decoding means provided for each bit of inputted dividend data that outputs quotient data and remainder data produced by dividing a value held by a bit by a prescribed divisor when said bit is "1";
    first quotient adding means that adds quotient data outputted for each bit from said first decoding means;
    first remainder adding means that adds remainder data outputted for each bit from said first decoding means;
    second decoding means provided for each bit of added remainder data outputted from said first remainder adding means that outputs quotient data and remainder data produced by dividing a value held by a bit by a prescribed divisor when said bit is "1";
    second quotient adding means that adds quotient data outputted for each bit from said second decoding means;
    second remainder adding means that adds remainder data outputted for each bit from said second decoding means;
    third decoding means provided for each bit of added remainder data outputted from said second remainder adding means that outputs quotient data and remainder data produced by dividing a value held by a bit by a prescribed divisor when said bit is "1";
    third quotient adding means that adds quotient data outputted for each bit outputted from said third decoding means;
    corrective decoding means that outputs a corrective quotient value and a corrected remainder value when a remainder value based on remainder data outputted for each bit from said third decoding means is equal to or greater than said prescribed divisor; and
    fourth quotient adding means that adds each output of said first quotient adding means, said second quotient adding means, said third quotient adding means, and said corrective decoding means and outputs final quotient data.

3. A method of dividing by a constant comprising the steps of:
    a first step in which dividend data are inputted to a first decoding means provided for each bit of said dividend data;
    a first decoding step in which quotient data and remainder data are generated when each bit of said dividend data is divided by a prescribed divisor;
    a first quotient adding step and a first remainder adding step in which each of quotient data and remainder data generated for each bit in said first decoding step are added and sum data are generated for each;
    a second decoding step in which sum data of remainder data generated in said first remainder adding step are applied to a second decoding means provided for each bit, and in which quotient data and remainder data resulting from dividing each bit of sum data of remainder data by said prescribed divisor are generated;
    a second quotient adding step in which quotient data generated for each bit in said second decoding step are added;
    a corrective decoding step in which, based on remainder data generated for each bit in said second decoding step, quotient corrective data and corrected remainder data are outputted when the remainder value is equal to or greater than said prescribed divisor; and
    an outputting step in which quotient sum data generated in each of said first and second quotient adding steps and said quotient corrective value are added and the result is outputted as the final quotient data, and in which the corrected remainder value generated by said corrective decoding step is outputted as the final remainder data.

4. A method of dividing by a constant comprising the steps of:
    a first step in which dividend data are inputted to a first decoding means provided for each bit of said dividend data;
    a first decoding step in which quotient data and remainder data are generated when each bit of said dividend data is divided by a prescribed divisor;
    a first quotient adding step and a first remainder adding step in which each of quotient data and remainder data generated for each bit in said first decoding step are added and sum data are generated for each;
    a second decoding step in which sum data of remainder data generated in said first remainder adding step are applied to a second decoding means provided for each bit, and in which quotient data and remainder data resulting from dividing each bit of sum data of remainder data by said prescribed divisor are generated;
    a second quotient adding step and a second remainder adding step in which quotient data and remainder data generated for each bit in said second decoding step are each added and sum data for each are generated;
    a third decoding step in which sum data of remainder data generated in said second remainder adding step are applied to a third decoding means provided for each bit of said sum data of remainder data, and in which quotient data and remainder data resulting from dividing each bit of sum data of remainder data by said prescribed divisor are generated;

a third quotient adding step in which quotient data generated for each bit in said third decoding step are added;

a corrective decoding step in which, based on remainder data generated for each bit in said third decoding step, quotient corrective data and corrected remainder data are outputted when the remainder value is equal to or greater than said prescribed divisor; and an outputting step in which quotient sum data generated in each of said first, second, and third quotient adding steps and said quotient corrective value are added, and the result is outputted as the final quotient data, and in which the corrected remainder value generated in said corrective decoding step is outputted as the final remainder data.

5. A constant divider, which is a divider in which a dividend is divided by a divisor that is a predetermined number, comprising:

a decoder group composed of decoders that receive a dividend, that are provided for each bit of the binary number of said dividend, and that, when said bit is "1", output a quotient and a remainder produced by dividing a value held by said bit by the divisor, and when said bit is "0", output "0" as the quotient and the remainder;

a quotient adder that adds the value of quotients outputted by each decoder of said decoder group; and a remainder adder that adds the value of remainders outputted by each decoder of said decoder group.

6. A constant divider comprising:

a plurality of stages of partial dividers that divide a dividend by a divisor which is a predetermined number and that each include: a decoder group composed of decoders that receive a dividend, that are provided for each bit of the binary number of said dividend, and that, when said bit is "1", output a quotient and a remainder produced by dividing a value held by said bit by the divisor; and when said bit is "0", output "0" as the quotient and the remainder; and a quotient adder that adds the values of quotients outputted by each decoder of said decoder group;

remainder adders in said partial dividers other than the last stage that add values of remainders outputted by each decoder of said decoder group of that stage;

corrective means in said partial divider of the last stage that outputs a corrected output of a quotient and a corrected output of a remainder produced by dividing by the divisor the output value of the remainder of each decoder of said decoder group of the last stage; and a quotient output adder which adds outputs of said quotient adders of each stage and said corrected output of the quotient of the last stage, wherein said partial divider of the first stage receives said dividend and said partial dividers of each succeeding stage receive as a dividend the output from said remainder adder of said partial divider of the preceding stage; wherein the output of said quotient output adder is taken as the final quotient and said corrected remainder output from said corrective means of said partial divider of the last stage is taken as the final remainder.

7. A constant divider according to claim 6 wherein said corrective means is a decoder.

8. A constant divider according to claim 7 wherein the number of said decoders included in the first stage of said decoder group of said plurality of stages of partial dividers is 64.

9. A constant divider according to claim 7 or claim 8 having two stages of said partial dividers.

10. A constant divider according to claim 7 or claim 8 having three stages of partial dividers.

11. A method of dividing by a constant in which a dividend is divided by a predetermined divisor, said method being a division method which successively executes a plurality of division steps including a decoding step in which a dividend is received, and for each bit of the binary number of said dividend, a quotient and remainder produced by dividing a value held by a bit by a prescribed divisor are outputted when said bit is "1", and "0" is outputted as quotient and remainder when said bit is "0"; and a quotient adding step in which quotients outputted for every bit in said decoding steps are added;

the division method comprising:

in said plurality of division steps other than the last division step, remainder adding steps in which remainders outputted for each bit are added;

in the last division step of said plurality of division steps, a corrective step in which a corrective output of the quotient and corrective output of the remainder produced by dividing by said prescribed divisor a remainder outputted for every bit are outputted; and a quotient output adding step in which, in the first of said division steps, the dividend of the sought division is received as said dividend, and in succeeding of said division steps, the output of said remainder adding step of the preceding division step is received as said dividend, and moreover, each output of said quotient adding steps and said corrective output of said quotient of the last of said division steps are added;

and wherein output of this quotient output adding step is taken as the final quotient, and the corrected output of said remainder of said corrective step of the last of said division steps is taken as the final remainder.

12. A method of dividing by a constant in which a dividend is divided by a predetermined divisor according to claim 11, wherein said corrective step is a decoding step using a decoder.

13. A method of dividing by a constant in which a dividend is divided by a predetermined divisor according to claim 12 wherein said division steps are executed two times.

14. A method of dividing by a constant in which a dividend is divided by a predetermined divisor according to claim 12 wherein said division steps are executed three times.

* * * * *